(12) United States Patent
Rao

(10) Patent No.: US 10,708,216 B1
(45) Date of Patent: Jul. 7, 2020

(54) CONVERSATIONAL USER INTERFACES AND ARTIFICIAL INTELLIGENCE FOR MESSAGING AND MOBILE DEVICES

(71) Applicant: Sanjay K Rao, Palo Alto, CA (US)

(72) Inventor: Sanjay K. Rao, Palo Alto, CA (US)

( * ) Notice: Subject to any disclaimer, the term of this patent is extended or adjusted under 35 U.S.C. 154(b) by 192 days.

(21) Appl. No.: 15/645,410

(22) Filed: Jul. 10, 2017

Related U.S. Application Data

(60) Provisional application No. 62/337,534, filed on May 17, 2016.

(51) Int. Cl.
*H04L 12/58* (2006.01)
*H04M 1/725* (2006.01)
*G06Q 50/00* (2012.01)
*G06Q 30/02* (2012.01)

(52) U.S. Cl.
CPC ......... *H04L 51/32* (2013.01); *G06Q 30/0255* (2013.01); *G06Q 50/01* (2013.01); *H04L 51/02* (2013.01); *H04L 51/16* (2013.01); *H04M 1/72552* (2013.01)

(58) Field of Classification Search
CPC ......... H04L 51/32; H04L 51/02; H04L 51/16; G06Q 50/01; G06Q 30/0255; H04M 1/72552
See application file for complete search history.

(56) References Cited

U.S. PATENT DOCUMENTS

2013/0055112 A1* 2/2013 Joseph ................. G06Q 10/107
715/758
2017/0168692 A1* 6/2017 Chandra ................. G06F 3/017

* cited by examiner

*Primary Examiner* — Benjamin R Bruckart
*Assistant Examiner* — Tien M Nguyen

(57) ABSTRACT

Intelligent assistant may integrate into social networks and devices to enable efficient messaging within group message threads. Various neural networks may be created and learning behaviors may be modeled to generate custom and context and intent specific intelligent assistants. The social network conversational intelligent assistant agent may be in an always on listen state to join conversations or may be commanded to join a group messaging thread on demand by one or more participants. Various widgets may be enabled to disappear and appear with the chat messages dynamically based on user conversations. A bot directory and marketplace may be enabled to allow for a plurality of assistants to be used across platforms including voice, text, group chat, enterprise messaging, and social networks.

24 Claims, 7 Drawing Sheets

CONVERSATIONAL USER INTERFACES AND ARTIFICIAL INTELLIGENCE FOR MESSAGING AND MOBILE DEVICES

BACKGROUND

This application claims priority to U.S. Patent Provisional Application No. 62/337,534, filed on May 17, 2016; the present application incorporates by reference in the entirety the afore mentioned application.

The technical field herein relates to communication messaging systems. Social networking messages and group chat conversations can become overly long in their duration and involve multiple repeated messages. Individuals may be overwhelmed with messages especially when users on one group chat are in different time zones. Group chat messages and discussions that become too extensive further prevent effective reviews of the thread or an ability for members who have been offline to catch up to the conversation.

SUMMARY

The summary contained herein reflects some of the aspects of the present disclosure. The disclosure as a whole should be considered to appropriately identify the scope and aspects of the elements of this disclosure.

A social networking platform, professional networking platform, and/or messaging platform may be enabled to allow for individuals to have a plurality of relationships between people, places, objects, structured and unstructured data sources, and artificial intelligence assistant bots.

It is an aspect of the present disclosure to enable effective and simple chat digests. In some variations a dashboard and real time chat assessment may be created so as to identify key statistics including number of messages sent, time of day of messages sent, most active posters, most active channels, and most controversial channels.

It is an aspect of the present disclosure to enable simple polling and feedback. In one embodiment, a mobile application may be enabled with a simple click sequence to enable a survey from users. A user for example, may be enabled to specify their responses for lists of questions from various devices including a users phone or from a separate social networking service.

The present disclosure teaches methods and systems to enable assistants to be embedded into the social networking platform or directly into group chat message threads so as to allow conversational approaches to user feedback, user actions, and accessing disparate data sources.

The platform leverages various widgets, assistants, scheduling user interfaces, and other component modules. Certain polling and database and record updating activities may be done directly within the messaging application so as to not interrupt the interactivity of a social networking application and a group chat.

It is an aspect of the present disclosure that the social networking platform may be encompass one or more of a plurality of applications and contexts including messaging, social and professional networking, social fun and social media, event planning, dating, ecommerce, media viewing, news, travel, collaboration, and other areas.

It is an aspect of the present disclosure to enable relationships and/or content may be bi-directional, uni-directional, ephemeral, location dependent, or context dependent, time of day dependent, or any mix of theses or combinations thereof. Social networks may be public private and individuals may connect with each other as a friend, contact, follower, or following. Users may create one or more public or private groups and channels may be created based on interest topic areas and aggregated postings from multiple users, groups, placed into one or more channels.

The social networking services may be accessible on web, online, HTML 5, mobile devices, mobile applications, cloud based intelligent assistants. These devices may each have various memory, processors, CPUs, GPUs, controllers, touch sensitive displays, network interface components. Software systems such as applications, operating systems, and application programming interfaces may be enabled for use by these components.

It is an aspect of the present disclosure to enable disappearing widgets and assistants in a conversation message flow or message thread.

In various instances, stickers, filters, emojis may be integrated into message flows.

It is an aspect of the present disclosure to enable integration between a social networking application and one or more web or mobile or cloud based applications including a calendar application, email application, or scheduling systems.

An enterprise messaging platform may include various chat intelligent bots, artificial intelligence (AI) or voice recognition bots, application bots, intelligent service bots, and combinations thereof. Intelligent bots referred herein are seen to encompass conversational software implemented agents that can respond to queries from a user with a natural language response with data, information, and responses therein.

In some embodiments workflow may be offloaded to message bots that are configured to run in the cloud or on one or more mobile devices.

Various neural networks may be created and learning behaviors may be modeled to generate custom and context and intent specific intelligent assistants.

In one or more embodiments, commands may be enabled using a * or ** / or a message out to the @bot_Name, @system_provider or other system to call upon other chat intelligent bot or chat subsystem.

In some embodiments, the chat device may be enabled to discuss and provide data to various corporate systems including customer relationship management systems, CRM systems, performance management systems, and other information technology devices.

It is an aspect of the present disclosure to enable a messaging bot to be connected to a customer relationship management systems 904 or information technology human resource (HR) systems to enable contact records to be updated based on the conversation dynamics.

It is an aspect of the present disclosure to enable a message bot may be used to feedback of products, sales meetings, employees, presentations and other assistance.

The present disclosure enables for intelligent chat intelligent assistant bot conversational agents to be used to interact with individuals using voice or messaging commands and conversations to act upon input from the user. These intelligent assistant may seamless integrated into group chat and messaging systems. As an example, when the conversation on a group text messaging thread becomes less active, the chat intelligent assistant or bot may suggest topics of conversation to individuals by posting a message in the thread that is only available to one party or they may post the message to all of the individuals on the thread. The chat bot messages may appear in the group chat message thread but include a sentence or other indicator which is only viewable by one party on the group chat thread so as to provide instructions to one member of the system without disclosing said instructions or other information to everyone on the thread.

In one variation, an artificial agent chat intelligent assistant or bot may be enabled to function as a personal concierge service to the employee and communicate with multiple databases and sources to intelligently discuss conditions with a user.

For example, a user may request what activities they may do in a particular city or information of a particular client or employee. In this instance, the intelligent agent may use historical data around what places other individuals in the city did using biographical, demographic, and behavioral data to customize the response. A user may then message directly with the concierge as a contact of the user and strike conversations with the agent as if it were a person contact. In some embodiments, a user may message a sales bot to inquire if there are any prospects within their vicinity. The bot may connect to the bot server and in turn consult a CRM system including records for meetings and notes. The bot may use the GPS location or wireless location of the user in conjunction with a query of local customers or prospects locations to recommend companies or people to visit with.

In yet another instance, a chat agent may be enabled to reply on behalf of the user to various group chat threads. In these instances, the chat bot may be instructed with a table of rules one level, two levels, or multiple levels deep. The chat bot assistant may be enabled to respond to customer inquiries, to start an email thread or chat message, to set up a meeting, or to use other custom templates to respond to comments and meetings. The chat bot may be enabled to list a series of opportunities, pipeline, or company records directly within an enterprise messaging system for example. The data for the opportunities may still reside in the CRM systems. An HR system and analytics system may be enabled to list recent conversations between employees.

The present disclosure enables real time conversation assessments including information on the chain of decision making and follow ups as to whether documents were actually sent to customers.

The present disclosure enables for individuals to be allowed to be enabled to request feedback from coworkers and peers using the platform. As an example, a quick feedback poll may be enabled to allow individuals to express their thoughts after a meeting at the office. A rating for a meeting for example may be sent directly within a chat message thread or via a browser extension or plugin.

In another embodiment, repeatedly polling individuals as to their work efforts, progress, sales meetings on a group chat can make the volume of messages on the chat high. Responsive to this, the system including one or more servers may automatically use natural language processing to determine that an event is being planned and bring up a custom event planning app interface into the message thread which allows the user to state their availability to a poll directly in the message thread without having the responses be delivered to all the participants until multiple responses are fully come together.

In yet another variation, individuals may annotate a message on a group chat thread and have that annotation only be available to a subset of individuals on the thread. This enables the individuals to be able to interact in multiple ways with each other on one group message thread. That is a subset of the group conversation may occur directly within the group conversation. In the annotation mode, a user may highlight a specific message or post and use a second menu to comment back on the post to other contacts. These contacts in viewing the message thread who are intended to receive the post may see a second popup menu with their view of the thread containing the sub-commentary.

It is an aspect of the present disclosure to enable real time bidding and ad networks to participate on group chat and messaging boards. These chats may be classified by the types of people, the message content, the historical content, location, types of devices, and other factors. As an example, an ad network may insert an advertisement about a local restaurant upon a message in the group chat asking to setup dinner plans. An ad server in conjunction with a mobile messaging server may coordinate insertion of the ad while keeping conversations anonymous with respect to third party networks. The ad clickthru may drive customers to a web page or other mobile ad unit or it may also drive the user to a sales chat bot which is enabled with a set of tables and conversation rules to capture the potential purchasers desires and contact information.

It is an aspect of the present disclosure to enable purchasing and shopping directly within a group message thread in which participants may respond to the group message thread with instructions to shop and their reply to the group chat thread is not viewable by members of the group chat thread and is only viewable to their own view of the group chat message thread. As an example, a user may respond to an advertisement inserted into a group chat thread with # buy and that response may only appear in the user's view of the group chat thread. A second or third user also in the group, channel, or group chat may not receive the # buy sent from the first user in their view of the group chat thread. Each ad inserted may be enabled to specify various calls to action.

In some embodiments, a mobile application may be enabled to use a pressure touch system or a multiple menu system to enable individuals to interact with other individuals on a group message thread and interact with advertisements and buying opportunities without leaving the thread. As an example, a user who presses firmly against the display of a mobile device may be enabled to bring up a popup menu, wherein the popup menu includes an advertisement that was listed in line in the message thread. Shopping and transactions may occur dynamically on the pop-up message thread within the group chat messaging system so as to allow the group chat message to appear on the screen simultaneously with the pop up advertisement in front of the mobile application. The rate at which advertisements are inserted into a chat conversation may be linked to the rate at which messages are sent to the thread. In periods of low chat responses, an advertisement may be inserted whereas in high chat periods, responses may be limited.

An enterprising messaging platform may include various chat intelligent bots, artificial intelligence (AI) or voice recognition bots, application bots, intelligent service bots, and combinations thereof. Intelligent bots referred herein are seen to encompass conversational software implemented agents that can respond to queries from a user with a natural language response with data, information, and responses therein.

In some embodiments workflow may be offloaded to message bots that are configured to run in the cloud or on one or more mobile devices.

Various neural networks may be created and learning behaviors may be modeled to generate custom and context and intent specific intelligent assistants.

In one or more embodiments, commands may be enabled using a * or ** / or a message out to the @bot_Name, @system_provider or other system to call upon other chat intelligent bot or chat subsystem.

In some embodiments, the chat device may be enabled to discuss and provide data to various corporate systems including customer relationship management systems, CRM systems, performance management systems, and other information technology devices.

It is an aspect of the present disclosure to enable a messaging bot to be connected to a customer relationship management systems 904 or information technology human resource (HR) systems to enable contact records to be updated based on the conversation dynamics.

The present disclosure enables for intelligent chat intelligent assistant bot conversational agents to be used to interact with individuals using voice or messaging commands and conversations to act upon input from the user. These intelligent assistant may seamless integrated into group chat and messaging systems. As an example, when the conversation on a group text messaging thread becomes less active, the chat intelligent assistant or bot may suggest topics of conversation to individuals by posting a message in the thread that is only available to one party or they may post the message to all of the individuals on the thread. The chat bot messages may appear in the group chat message thread but include a sentence or other indicator which is only viewable by one party on the group chat thread so as to provide instructions to one member of the system without disclosing said instructions or other information to everyone on the thread.

It is an aspect of the present disclosure to enable intelligent offloading of messages in a group chat thread to one or more popup chat modules or bot/assistants that actively enter and exit message threads and conversations.

It is an aspect of the present disclosure to enable an intelligent assistant chat device to be able to converse with a plurality of information IT systems from an organization or a second organization or other enterprise systems. As an example, an organization with a sales and customer relationship management (CRM) system may be enabled to interface with a intelligent chat bot or assistant. This assistant may be enabled to be pre-programmed with a variety of questionnaires related to actions. Accordingly, a sales representative may be enabled to converse with a sales assistant chat bot on a periodic basis to answer questions as to how their sales are proceeding with one or more customers. As an example, a @sales_representative_1 user may respond to a @salesagent on a group message with a command such as completed an order for sale of: @salesagent: item, $500, 200 units, # saleswins. In this instance, the @salesagent bot will update a CRM system with the sales win and the feed of # saleswins may be updated to include a message from @sales_representative_1 with the sales win. Other users may be enabled to include their wins on the similar # saleswins feed.

A record for example in a sales management system may be created directly using a conversation. In these instances, a natural language processor is enabled to convert dialog into structured data from a conversation unstructured data and update CRM records. As an example, a user may ask a @salesbot:

1. User: "Lets create a new record @salesbot"
2. Bot: What is the name? User CompanyA
3. Bot: What is the address of CompanyA? User <enter address>
4. Bot: Based on your calendars, you should reach out to this customer next Thursday @10a. Would you like me to create an appointment?

In yet another instance, a chat agent may be enabled to reply on behalf of the user to various group chat threads. In these instances, the chat bot may be instructed with a table of rules one level, two levels, or multiple levels deep.

BRIEF DESCRIPTION OF SEVERAL VIEWS OF THE DRAWING

The accompanying drawings, being incorporated in and forming a part of this specification, illustrate embodiments of the disclosure and, together with the description, serve to explain the principles of the present disclosure.

DETAILED DESCRIPTION

Reference will now be made in detail to the preferred embodiments of the disclosure, examples of which are illustrated in the accompanying drawings. While the disclosure will be described in conjunction with the preferred embodiments, it will be understood that they are not intended to limit the disclosure to those embodiments. On the contrary, the disclosure is intended to cover alternatives, modifications and equivalents, which may be included within the spirit and scope of the disclosure as defined by the appended claims.

Figure 1:
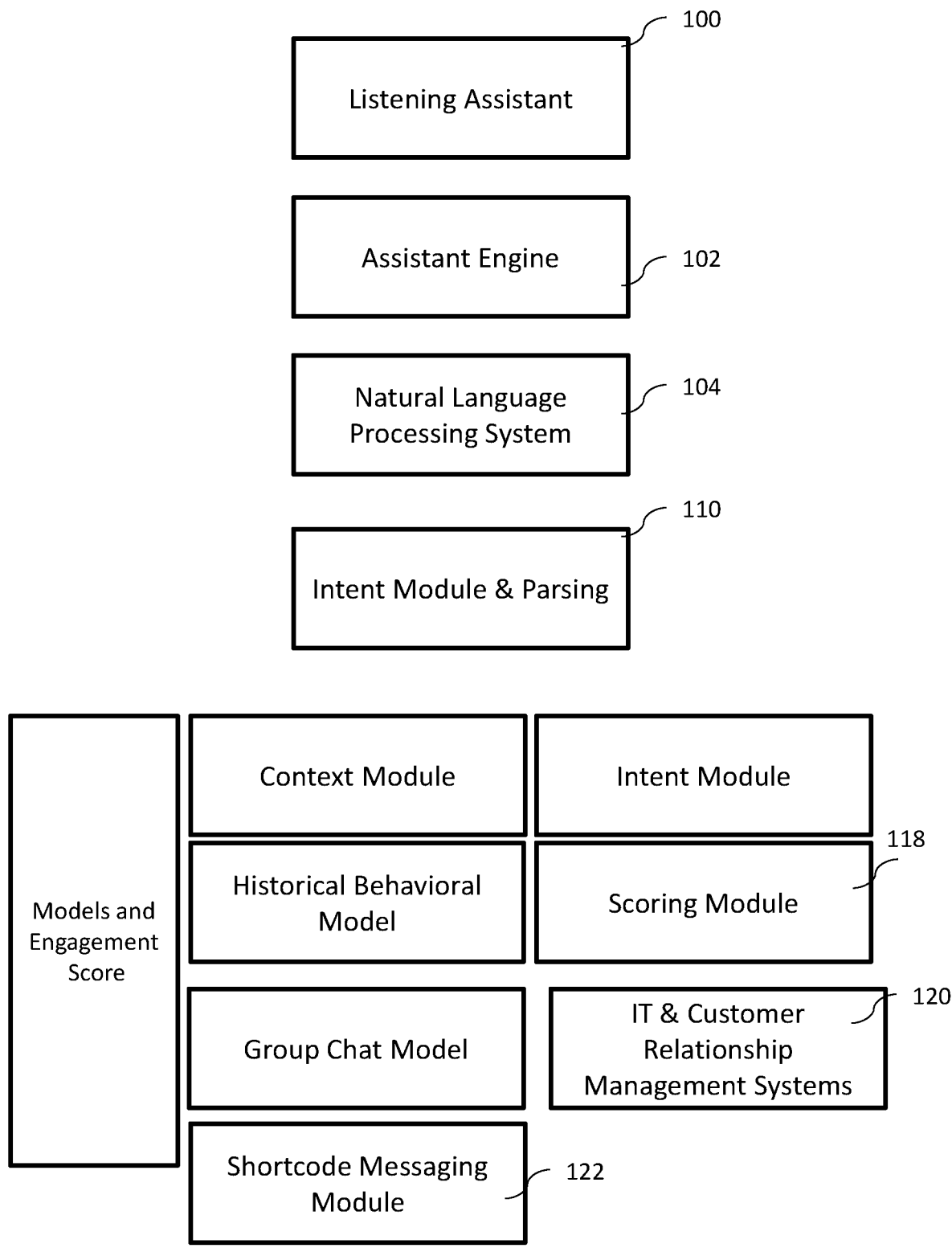
FIG. 1 shows various intelligent agent listening agents implemented as one or more communication modules.

Referring to FIG. 1, FIG. 1 states various modules within the system that may be implemented at a server, cloud, or client device level. These modules include: a presence and activity manager 1108, and a chat intelligent assistant module 110. A presence manager module may use as an example the activity in one or more threads as an indication that the user is highly available for text messaging or group chatting. A suggestion module may further suggest to a user that the user should interact with another user via a group message thread or via direct message. A scoring module of a thread 104 may assess in real-time or time shifted the attitudes of individuals and the various group message or channels by marking word with a point or fraction thereof, a point or fraction thereof, and frequency of posting (such as number of times a day or week), and ability to restart a conversation. The ability to restart a conversation can be calculated by assessing the first person to post a message to a group message thread subsequent to a period of in activity such as 2 hours, 1 day, and so forth. The period of inactivity prior to a new message thread may enable the system to determine where a new topic in the group chat message is occurring. For example, if there has not be a comment on a thread in a period above a threshold value, such as 1 hour, then this may be seen as a new topic. The new topic when subsequently viewing may cause the NLP system to use this as a node and then analyze subsequent messages as to their overlap in terms of word categories with the main topic and subsequent messages. In reviewing subsequent threads, this may then allow this start to be linked to a plus + sign or other indicator to add hierarchy to a typically non-hierarchical flat group message thread. In a post message thread review, topics can be skipped over to allow for message digests to be created wherein individuals can see specific topics without having to read an extended message thread.

As an example, the scoring module 118 may determine that the thread is boring, contentious, collaborative, repetitive, based on the words, usage, location, participants, and other factors. A scoring module 118 may also be used in conjunction with an ad network to determine which ads to place into a message thread or which intelligent assistant or to advertise to the message thread. The scoring module may work in conjunction with a sales and performance management system to enable one on one meetings and work discussions. The scoring module 118 may further identify the highest posters in a thread, the least active in a group message thread and other activity levels. The word count per response of an individual in a thread may be calculated on a per user basis including a per day per week and per chat thread. A first user with a first group chat message thread may be compared against the analysis of the same first user in a second group chat thread.

The activity scores of the first users vary based on the group chat. An engagement score associated with the user may be calculated on a per thread basis. Overlapping members of the thread may be identified. A social ties score may be calculated by calculating the number of messages, word count, and frequency with which a first user interacts with multiple other users on the threads. If a user is active on a thread with overlapping members but more active on a first thread versus a second thread, then the social ties score may determine a higher affinity or desire to disclose based on the participants of the first group thread versus the second group thread. The social ties score may calculate the number of messages between a user 1 and a user 2 relative to the average, variance, standard deviation of the number of messages between the user 1 and other contacts to user N. This analysis may control for the number of participants on the two threads. Alternatively, the activity score may be calculated on a per topic basis in which each thread is associated with a plurality of topics or interest areas. As an example, if a first user is highly active on a thread related to shopping clothes but not active on a thread related to shopping for shoes, the user interest may be determined to be stronger in relation to clothes versus dresses. This may further be fed into a advertising network system for use of ad targeting such as targeting advertisements for dresses above shoes. For threads between users on a company platform, the score may be used to calculate an affinity or internal ties score between the individuals on the platform.

In yet another embodiment, if a set of users are discussing a particular product, brand, retailer, or location, the intelligent assistant listening agent may send a request to one or more ad networks to bid on entering the conversation with various offers or coupons.

It is an aspect of the present disclosure to enable users to create shortcodes for writing responses in a chat message and for viewing messages in a chat message. As an example, a user which seeks to write sounds good may simply "SG" or "sg" and press submit or enter to transmit. The message displayed in the group chat and delivered may be changed by the messaging server to sounds good fully spelled out. Shortcodes may be dynamically created based on a message thread or inputted by one or more users. Shortcode messaging module 120 differs from predictive text as the predictive text system alters the words on the first user screen to fill them out prior to sending. The short code messaging system described herein allows for the words to be display in the shortcode on the first user's message and then expanded only in the view state.

Figure 2:
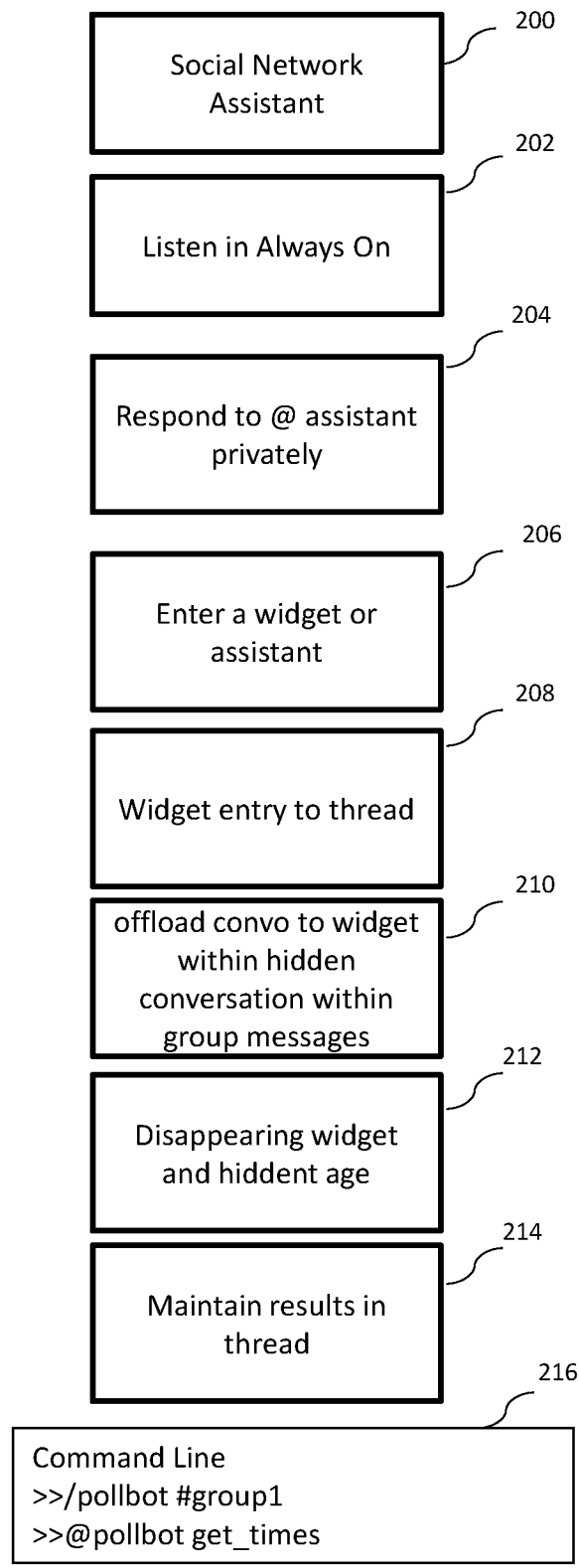
FIG. 2 shows an offloading of a conversation to a widget.

Referring now to FIG. 2, FIG. 2 depicts a message widget and or intelligent agent work flow in which the assistant intelligently enters into a conversation and disappears after a period of time. A social networking agent 200 may be in an active listening state in which it analysis conversations 202. A listening agent may be enabled to respond privately to a concierge 204. A workflow widget may actively monitor and parse conversations and enter a conversation based on a conversation monitoring results 206. A marketplace may be consulted to bring suggested assistants into a conversation 208. A conversation may be offloaded to a widget which may appear within an existing conversation and group chat system 210. The concierge user may be an artificial agent conversation bot capable of interacting with a natural language processing system.

Figure 3:
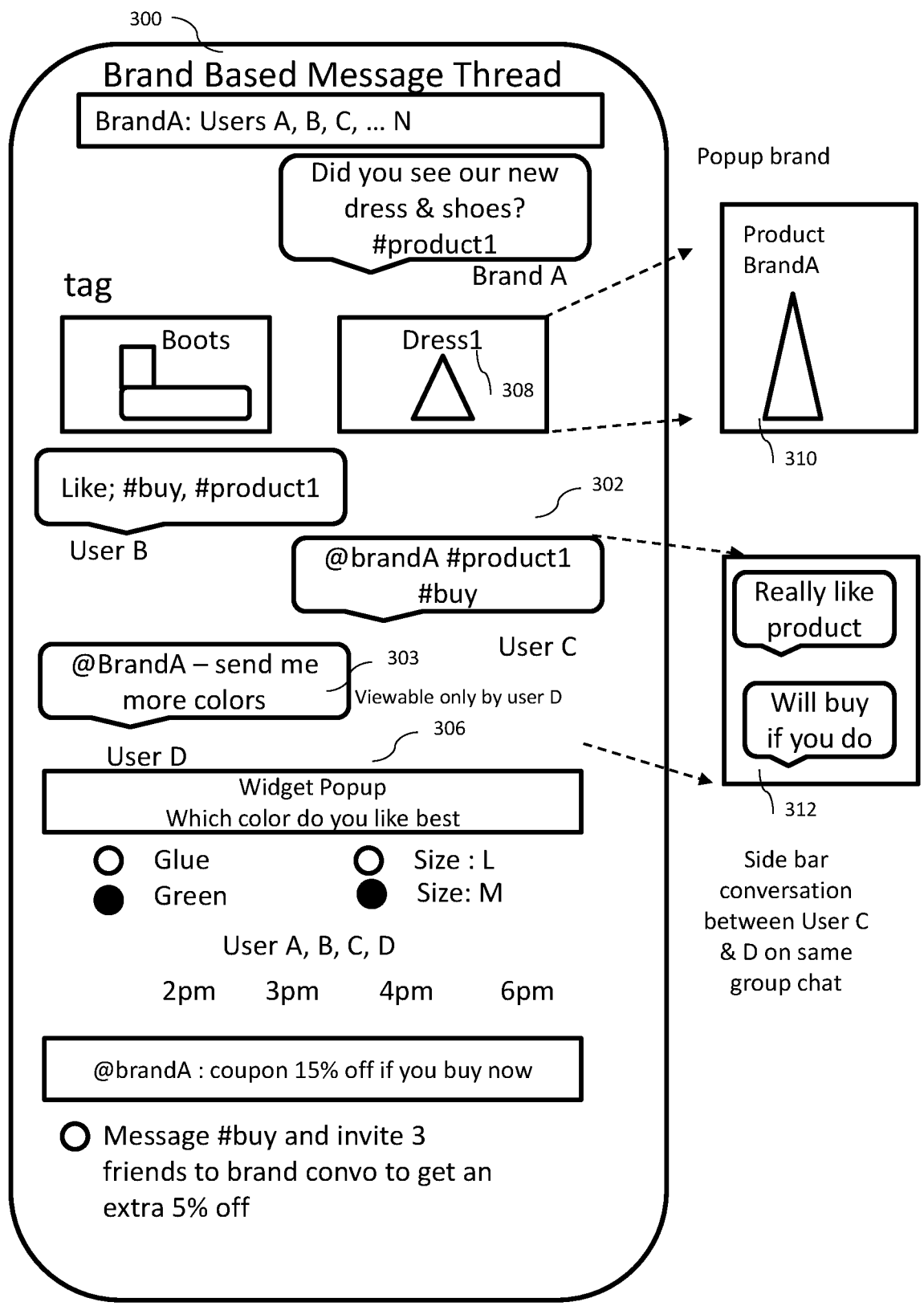
FIG. 3 depicts a messaging subsystem with widgets integrated into the group chat.

Referring now to FIG. 3, FIG. 3 depicts various widgets being integrated into a single flow of a messaging system. As an example, a product from a brand may be displayed within the messaging thread. A comparison of two products to buy may be entered in which case users on the thread can express like or interest between different products. Users may be able to respond to purchases within the thread 302 with buy instructions by responding to the group chat with # buy for example. This # buy may only be viewable by the user that sent the message and not all the members of the group message thread. Alternatively, a sales representative and a user may chat via a message system in a broadcast mechanism. For example, instead of hosting a webinar and individual sales meetings, a sales representative can enable their webinar to include a chat message flow to accept sales directly within this flow. These responses may be displayed to a first user in the first user thread while the thread will be viewed differently by a second user in the thread. In these instances, messages which are repeated by multiple users would not appear in the messaging thread to prevent overload of the message thread. A widget may be enabled to pop up with in a dedicated portion of the screen of a thread such as the bottom half or the top half of a thread 306. Brands may bid on threads to insert their products within the threads themselves. Recruiters may insert their job prospects within the threads.

Advertisements and brand offers may inserted directly into the group messaging feed 308. The mobile application is enabled to simultaneously allow for interaction with a widget and brand or other item directly within the messaging system via the use of a menu popup on the mobile device. The menu popup may be activated upon a pressure sensitive press against the display of the mobile device. In this instance, the force with which the user depresses against the content item may enable the content item to appear. In this instance, a pressure depress may enable the advertisement of the dress to appear and allow a single press to buy the product and a swipe left or swipe right to get rid of the popup above the device.

A popup chat may simultaneously allow for viewing of both the group chat 300 and a subgroup popup chat via a sidebar module 312. In this instance, a select users C and user D may want to privately discuss an aspect of the group conversation. Instead of joining a separate group chat with C and D only instead of User A and User B, a sidebar popup group chat may be enabled. This sidebar module 312 may allow for a popup conversation to be created between the two individuals in the foreground while still leaving in the background the overall group chat. Each of these chats may be updated simultaneously. The sidebar may be activated via a pressure sensitive press between multiple individuals on the group chat. The popup sidebar may be significantly smaller in size and enabled to automatically disappear after a set time period when there are no replies or upon a gesture of swipe left or swipe right.

The intelligent assistant may also cover commerce related applications such as shopping via a intelligent assistant. In yet another embodiment, images of products may be displayed in a direct message thread with an intelligent assistant, in a group message thread, or in another messaging environment. A buying button may be presented with a message feed. A group purchasing or multi-level marketing buying opportunities may also be enabled across one or more channels.

Ad networks may also engage in messages threads with ads inserted into the message thread dynamically by a third party ad network. Alternatively, an ad network may sponsor a intelligent assistant in return for data and interactivity data associated with the intelligent assistant.

The intelligent assistant may be enabled to unpack the location of the user, the context of the users conversation within the thread and across threads for customized responses, sentiment analysis, a customization for the current user, customization of the responses for the audience on a group chat message, and other factors. The system may use a learning model or other model customized to the individual, group, or channel to improve interactivity with a conversation or to understand the context, desires, use cases, users and other aspects of a conversation and a corresponding command.

Figure 4:
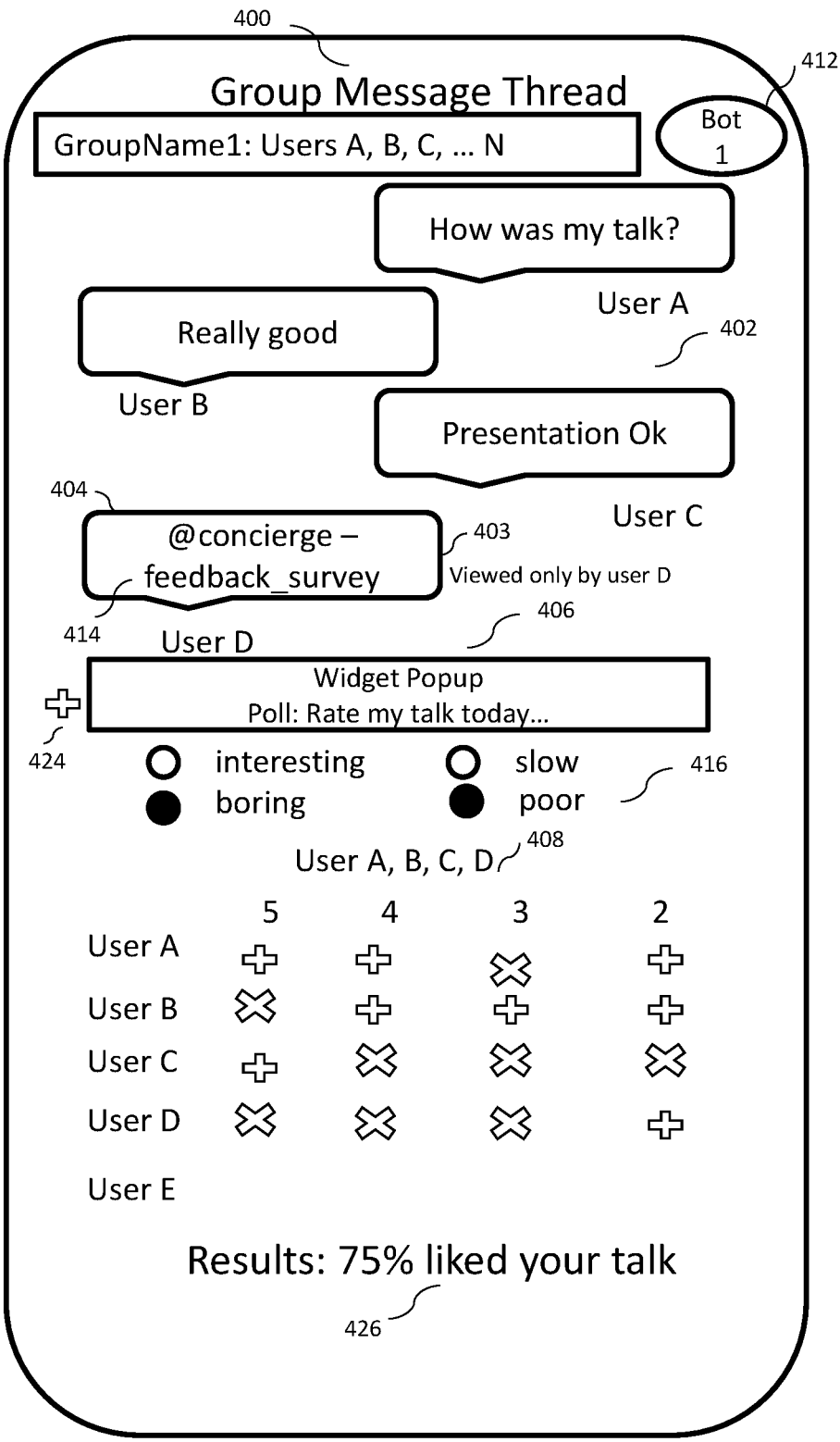
FIG. 4 depicts a chat subsystem with a collapsible survey and poll agent.

Enterprise and Personal Social Networks with Intelligent Assistants for Group Communication Management Referring now to FIG. 4, FIG. 4 depicts a group messaging thread that can be converted between messaging pictures, text, video and other content and actively integrated with widgets that enter and exit the feed based on user requests or based on automatically based on natural language processing of the thread contents and actions. The social network conversational intelligent assistant agent 404 may be in an always on listen state 412 to join conversations or may be commanded to join a group messaging thread on demand by one or more participants. Various agents 404 may be created and may be part of a intelligent assistant directory or marketplace each with its own name or as a subset of a concierge intelligent assistant 414. Intelligent assistant may be written to the messaging platform based on APIs or other items. The intelligent assistant widget may 416 may enter the workflow based on the activity over the conversation or based on a command from a user 403. The widget may in turn be added to conversations 420 and popup into the message thread so as to allow for continuous viewing of intelligent assistant or both the thread and the messages 402, 406.

Still referring to FIG. 4, the widget may be programmed to appear within the user interface of the thread message systems 406 such as a polling device. The widget may be allowed various access levels such as granting access to read the entire message to prepopulate the poll widget based on the times already indicated in the preceding messages 402, 403. The widget interface 406 may disappear from the thread 422 while the results of the widget may remain 408. This enables the thread to be compressed and still interactive with the participants. The widget may easily collapse or compress the results in the message thread 424 to allow for easy viewing of the survey poll or other items. Various command line interfaces 426 may be used to call up the intelligent assistant including the survey intelligent assistant or other communication widgets.

The intelligent assistant may appear within the thread while the same view of the thread is available. That is the overall group chat message thread persists and a popup intelligent agent may appear or the intelligent agent may enter the conversation thread and collapse away out of the message thread. Various intelligent agents may appear then at the top of the display area of the message thread in a listening state 412 and then appear within the message thread in an active state 408. When a bot is invited to listen to a thread various rules regarding the access to the commentary may be enabled. As an example the conversation transcript may be available via a third party API or other factor to the bot software system. Alternatively, names may be taken out of the conversation flow.

Figure 5:
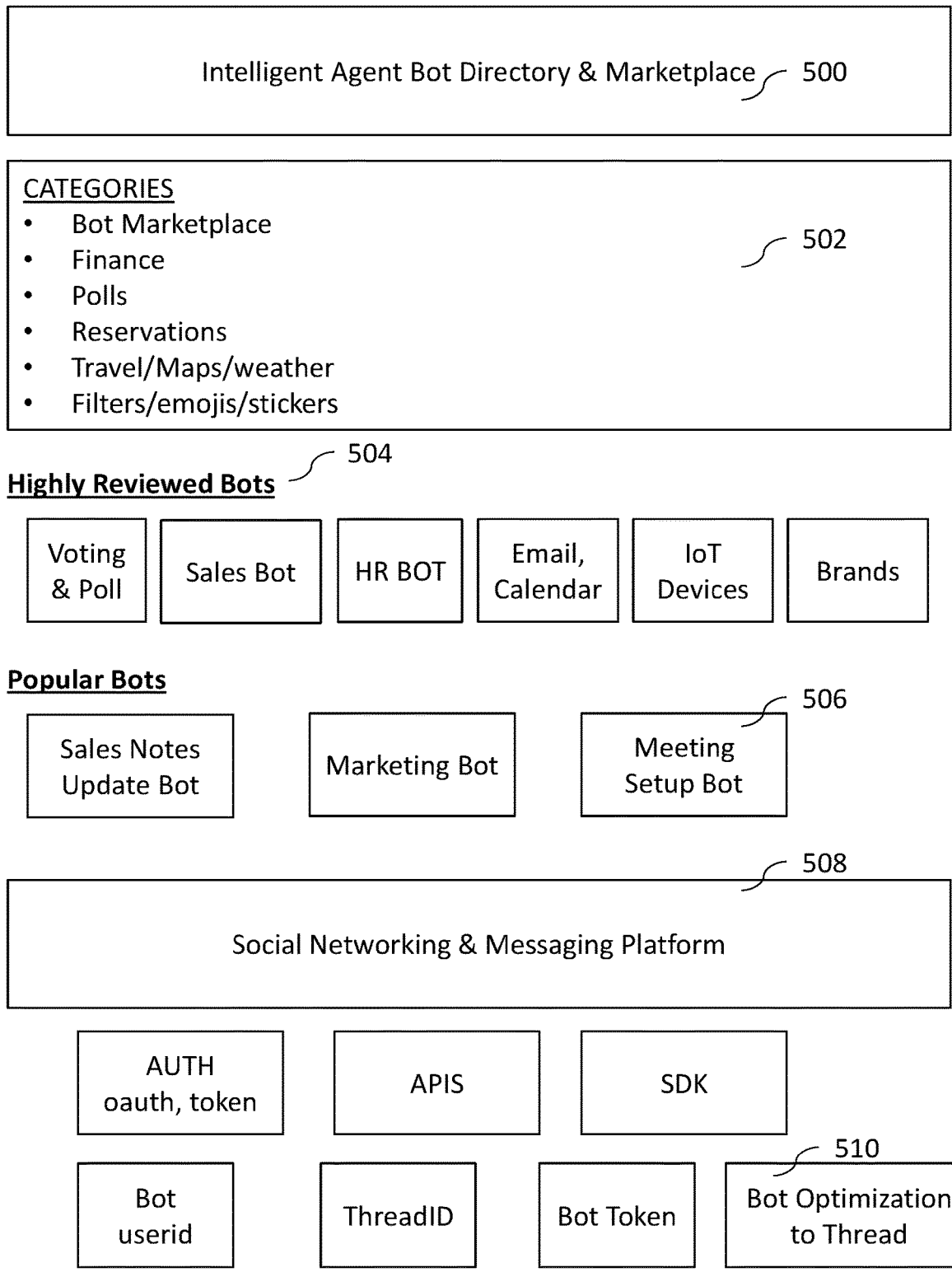
FIG. 5 shows a marketplace for widgets from third party developers with a price, rating, or reviews and/or as part of a company or general application store.

Referring now to FIG. 5, FIG. 5 depicts a marketplace and directory 500 of various bots, widgets, and/or intelligent assistants and first party and third party applications that can be developed for the platform. Certain intelligent assistant may be priced at free while others may cost money or only be available in personal or private clouds. The intelligent assistant may be put into various categories 502 for easier discovery or search by users. The platform may enable third party developers to create various intelligent assistant, agents, and intelligent services that integrate into the messaging platform. Intelligent assistant may also be classified into highly reviewed intelligent assistant 504 and popular intelligent assistant 506. Some of the intelligent assistant may include functions to interact via an API and server or cloud subsystems with internet of things devices such as alarm clocks, security systems, medical devices, lighting systems, tv systems, wearable devices, home automation devices, and other devices.

Still referring to FIG. 5, various items may include intelligent assistant that provide enterprise systems, project management integration, meeting scheduling systems, and reminder intelligent assistant. These may include various product and software as a service systems. Various applications may have a authentication token and OAUTH to the service 508. In various instances, a content format may be sent to the intelligent assistant using JSON and HTTP. In addition, a intelligent assistant optimization module 510 may assess threads in real-time to determine how to interject the most appropriate intelligent assistant from the marketplace to join the conversation. Alternatively it may suggest a intelligent assistant to include in the conversation or to join the message. The intelligent assistant optimization module 510 may use the rate of the message traffic in a given thread, the word choice, the categories, the recipients, the participants, the most active members of the conversation and other factors to intelligent assistant dynamically interject the intelligent assistant into the conversation.

In an embodiment, a server in conjunction with a intelligent assistant may engage in a conversation with a user and use the group text message thread and other communication to predict the set of actions of the user. A message may be parsed into different sub-segments to understand the context of the messages to the intelligent assistant, the desires, the people or objects to include, the date and the time, and other variables. The intelligent assistant or may accept various commands to coordinate a process with the mobile device or client device with one or more servers and third party servers.

The intelligent assistant may then convert the unstructured sentences and interactions via messages into structured data for execution by one or more systems. Various customized parsing systems may be used and messages may be processed locally, at one or more servers, or one or more public or private or semi-private clouds.

Figure 6:
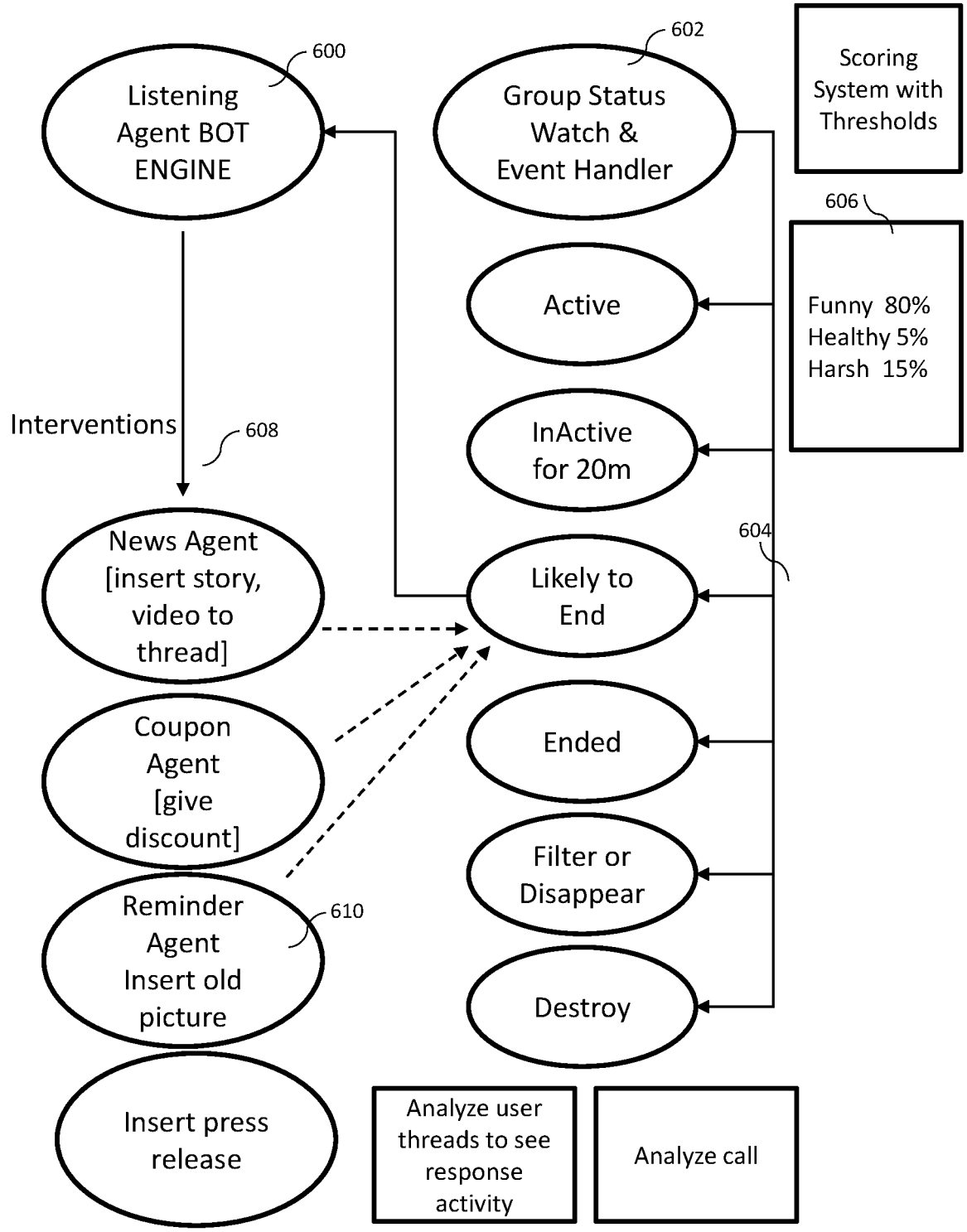
FIG. 6 shows a message interaction framework in which conversations can be augmented based on various real-time states and activities in the thread.

Referring now to FIG. 6, FIG. 6 depicts a message model framework in which the messaging and communication flow for a group, channel, network or set of individuals can be modeled behaviorally, historically, and predictively. In these various instances, a group status watch indicator can be enabled to classify the threads into various roles of active, inactive, likely to end, ended, disappear, filter, or destroy. A intelligent assistant listening agent and/or intelligent assistant engine may actively monitor conversations and activities per user or per set of users 600. An event handler and watcher 602 may be programmatically set up with a plurality of rules. Various modules may exist including actions to take when the message and conversation is active, inactive for a time period, likely to end using a predictive model, should be filtered or various actions should be programmed to take form. Similarly, the model may be enabled to predict when to schedule a follow up meeting with a customer or employee, or when to start a company with a particular or employee. The scoring module in conjunction with a message module may use email traffic from a first second or plurality users with a particular customer or employee to determine an interaction score for users via a chat or messaging platform. This in turn may be used to calculate a time to contact a user, a pipeline assessment module, or other factor.

Referring now to FIG. 6, FIG. 6 provides various widgets that may assist group messaging. An evaluation agent 600 may evaluate the context, language, word choice, velocity of messages, types of content, time of day, location of participants and other factors in real time of various message threads. These threads may be scored along various dimensions 606 and rated as funny, healthy, harsh, and other indicators. As an example, a comedy rated thread may include multiple responses including words such as "haha", "lol", "wow". Other words such as "escalate" or "like" may be associated with flagging of threads or creating digests of items that are liked by members on a thread. A hard thread may include words classified as critical, judging, etc. a table of words or a neural network of words and weights may be created to classify the message threads. Upon certain indicators reaching thresholds, the event handler for the thread may be enabled to take various actions 602 and interventions 608.

Full threads, channels, and group chats may be analyzed for sematic word analysis. As an example, a thread in a work environment may be audited and reviewed for words that are inappropriate. Alternatively, a time period may be set for analysis of chat messages. As an example, several messages on a chat board after normal working hours which may be set in a configuration setting may be flagged and charted. Individuals that repeatedly interact on a chat system after set working hours may be analyzed. A dashboard module may present the descriptive statistics including the number of messages sent during working hours versus those during non working hours, the amount of flow between a small set of participants versus the total number of spectators on a group message thread, the types of words used and categories of words used and how these words vary by hour and time of day; and other parameters. Conversations with customers, partners, managers, employees, direct reports may also be analyzed for assessing a score of engagement between individuals on a thread. This data may be combined with other data sources including calendar and email systems and sales wins/pipeline/CRM/performance reviews/HR systems to generate a full picture of the interactivity of users on the platform. Groups, teams, and departments that have good communication may be plotted against those with less effective communication. For example, groups that exhibit a high degree of conversations with certain terms and mostly during working hours may be highlighted and in certain cases scored higher.

Still referring to FIG. 6, these interventions 608 may include bringing into the conversation various other intelligent assistant such as news story intelligent assistant which publishes recent breaking news, a coupon agent which suggests events and coupons for the individuals, a reminder intelligent assistant which brings up old pictures from a message thread that has been archived 610. In other cases, the intelligent assistant may intelligently determine that a certain message thread, channel or group, is appropriate to terminate and end its existence. For example, a politics channel which features a certain candidate that has dropped out of the political race may no longer be an active thread. In this instance, the news intelligent assistant may insert stories about the candidate dropping out of the race. As the channel or group or message flow decreases, then the thread may automatically prevent additional postings to the feed. Alternatively, a channel may feature news about a specific company.

Figure 7:
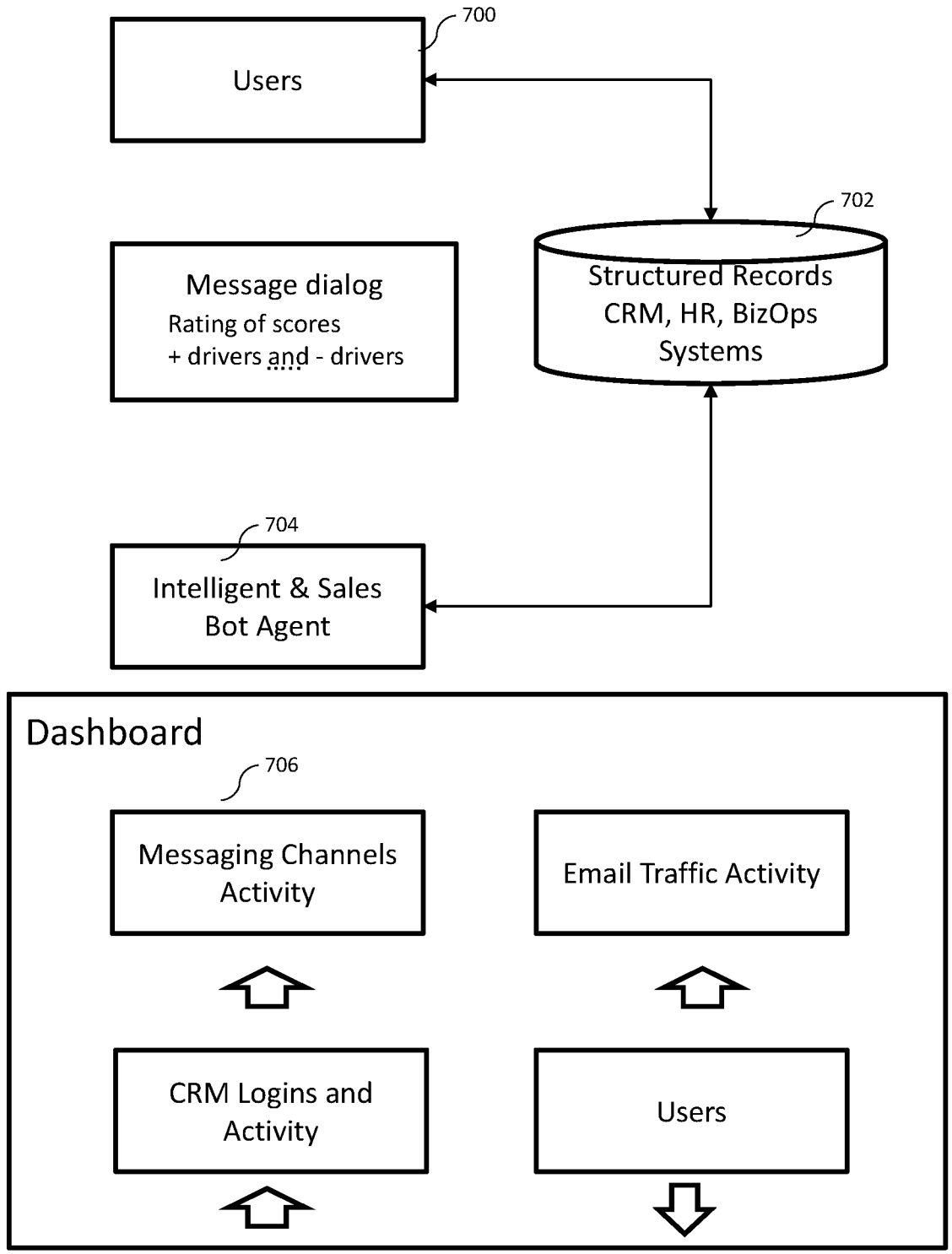
FIG. 7 shows a organization management tool for bot assistant interaction.

Referring now to FIG. 7, FIG. 7 depicts an intelligent assistant or bot interacting with a customer relationship management (CRM) system. In one instance a user may respond to a sales ai agent to request their sales pipeline, to update their quota, or to interact with their customers. In various embodiments, customer records may be requested within a group chat using a command. The sales bot may connect to a CRM system via an API. Commands: In yet another instance, the bot may be enabled to update a representative's pipeline via a command such as: ">user @salesAIbot update pipeline customer_name $2K". Various command structures may be created.

In various embodiments, group messaging channels may be enabled and the analytics on these channels may be fed into an organizational dashboard. The organizational dashboard may encompass various data sources including activity on messaging systems, HR data, sales CRM data. These disparate data sources may be analyzed using a NLP system and other parsers for keyword analysis and so forth. The activity may be displayed as a unified view of company activity, employee and customer engagement, and so forth.

Prediction and Reminder systems: The sales bot may be enabled to suggest a time and opportunity to discuss a sales opportunity with a customer. A predictive model may be enabled to determine when to send emails comments or other items to potential sales products. Multiple sales bots may be enabled to reply on behalf of sales representative. Various templates may be enabled in which an email or message or group channels message content may be customized to a customer or potential lead for various categories including open, close, and other factors. In one instance a chat message flow may be analyzed for the duration of time, number of messages, and integrated with other data sources including email and calendar instances to determine a last interaction score and likelihood to achieve quota for the quarter.

In some embodiments, a behavioral map may be created to identify key words, amount of interaction with customers or employees. As an example, for example, if a manager and direct reports and peers frequently interact with each other on a team, the thread may classified with a higher interactivity rating. Threads may be compared against other threads within the organization to determine a ranking of most active channels and conversations. These conversations may then be used to determine an average of the number of messages per team on a given day or weak. An engagement health score and an engagement detriment score may be calculated for each thread. The positive EHS may be based on the factors of percent of messages that are within working hours and those that are balanced in terms of the number of messages from each participant on a group chat message. A negative EHS may be calculated and determined based on word choice classified by those in less desirable categories and messages after work hours. An email message system may further be used to OAUTH to analyzed the overlap between message words in a group message and an email message. If the words are overlapped between these messages, then score may further be reduced.

The use of these multiple systems integrated into one view provides a unified view for the user but further for prediction modules which assess scores of user interactivity across messages, emails, meetings, and visits. The number of these items and further within the time period enables the for scores to be updated including the likelihood of closing a sale, the likelihood of a customer churn or employee churn, or when to interact best with an employee.

In various embodiments of the present disclosure, a messaging platform and social network may be implemented using a plurality of cloud servers, memory systems, and processors for instructions to be executed by one or more processors. Various embodiments described herein may be used in one or more modules for execution by these processors.

The foregoing description of specific embodiments of the present disclosure have been presented for purposes of illustration and description. They are not intended to be exhaustive or to limit the disclosure to the precise forms disclosed, and it should be understood that many modifications and variations are possible in light of the above teaching. The embodiments were chosen and described in order to best explain the principles of the present disclosure, and its practical application, to thereby enable others skilled in the art to best utilize the present disclosure and various embodiments, with various modifications, as are suited to the particular use contemplated. It is intended that the scope of the disclosure be defined by the Claims appended hereto and their equivalents.

What is claimed is:

1. A method for a messaging service comprising:
enabling a group message thread between a plurality of users to be displayed on one or more user interfaces of at least one mobile device;
while displaying the group message thread, further displaying one or more messaging applications to be integrated into the group message thread;
inserting a messaging assistant into the group message thread of the one or more interfaces based on a user command of at least a first user of the plurality of users;
wherein the message assistant is viewable within the group message thread only to the first user of the plurality of users; wherein the message assistant suggests topics of conversations to the first user based on activity of the group message thread, wherein the first user is enabled to interact with one or more responses to the message assistant within the group message thread such that the one or more responses to the message assistant is only viewable by the first user;
wherein the message assistant is enabled to accept structured and unstructured data as part of the one or more responses and to convert the one or more responses into a structured data response; and based on the structured data response, the message assistant is enabled to provide an interaction to the one or more messaging applications to the plurality of users within the group message thread.

2. The method of claim 1, wherein a poll is presented within the group message thread; and wherein the results of the poll are displayed on the at least one mobile device to a limited set of participants on a selective basis; and wherein the plurality of users sees a collated response of the poll and responses in a collapsible widget.

3. The method of claim 1, further enabling the message assistant to communicate with one or more users of the plurality of users on a channel and display a set of actions associated with the messaging assistant on the channel.

4. The method of claim 1, wherein the message assistant suggests a conversation topic to a channel message thread based on an activity level within the channel message thread.

5. The method of claim 1, wherein the message assistant is integrated into the group message thread based on an interactivity level determined in the group message thread.

6. The method of claim 1, wherein the messaging assistant is enabled to join the group message thread based on a slash indicator and an at sign indicator.

7. The method of claim 6, wherein a user of the plurality of users is enabled to purchase a product directly within the group message thread with a # buy identifier in a response.

8. The method of claim 7, wherein the response to purchase within the group message thread is not shared with the plurality of users of the group message thread and is only visible in the group message thread to the user making the purchases.

9. The method of claim 1, further comprising displaying a popup chat on the one or more interfaces that is responsive to a pressure sensitive depression on the one or more interfaces.

10. The method of claim 1, wherein a popup chat is enabled between a subset of the plurality of users in the group message thread; and wherein the group message thread is displayed in the background while the foreground displays the popup chat.

11. The method of claim 1, wherein at least one of the plurality of users on the group message thread is associated with an activity score.

12. The method of claim 11, wherein the activity score is associated with a category for the purposes of linking at least one of the plurality of users to one or more advertisements.

13. The method of claim 1, wherein one or more advertisements is inserted into the group message thread based on a rate of messages and wherein a low rate of message flow causes the one or more advertisements to enter the group message thread.

14. The method of claim 1, further comprising:
delivering an advertisement in the group message thread received by an advertisement server such that the advertisement is based at least in part on content of the group message thread; and wherein each of the plurality of users of the group message thread remain anonymous with respect to one or more third party networks.

15. The method of claim 1, further comprising:
providing a link to a web page within a mobile advertisement unit displayed within the group message thread such that the web page includes content inclusive of responses to a query acquired in the group message thread.

16. The method of claim 1, further comprising:

providing for display based on the message assistant a plurality of images with an interaction button coupled to at least one of the plurality of images.

17. The method of claim 1, further comprising:

parsing the group message thread to identify structured and unstructured data to be directly inputted into a structured database including a customer relationship management (CRM) system accessible by at least one server.

18. The method of claim 1, further comprising:

suggesting via a module to the first user of the plurality of users a recommended interaction between another of the plurality of users; and wherein the recommended interaction is visible in the group message thread only to the first user.

19. The method of claim 1, wherein a bot analyzes the group message thread, determines an engagement rate, and suggests a topic of conversation based on natural language processing of the group message thread.

20. The method of claim 1, further comprising:

displaying, on an interface of the first user, a set of options that comprises of a multi-select list within the group message thread from a bot; and creating a separate content unit for a separate message interaction with the bot and the first user within the group message thread and further accessible only to the first user.

21. The method of claim 1, comprising: providing one or more annotations on a specific message of the group message thread only available to a subset of the plurality of users of the group message thread.

22. The method of claim 21, comprising:

highlighting the specific message by presenting a popup menu to make a comment back on the specific message.

23. The method of claim 22, wherein the comment back on the specific message is only presented to a subset of the plurality of users of the group message thread in a subgroup chat.

24. The method of claim 23, wherein the subgroup chat is enabled to be displayed in the foreground while the group message thread is displayed in the background on the one or more interfaces of the at least one mobile device.

* * * * *